United States Patent Office 3,337,457
Patented Aug. 22, 1967

3,337,457
CRANKCASE LUBRICANTS COMPRISING A MINERAL AND SYNTHETIC ESTER OIL BLEND
Benjamin Thomas Fowler, Abingdon, Arthur John Caines, Windsor, Peter Ernest Baughan Fenton, London, and Peter Henry Sparks, Richmond, England, assignors to Esso Research and Engineering Company, a corporation of Delaware
No Drawing. Filed Feb. 8, 1965, Ser. No. 431,195
Claims priority, application Great Britain, Feb. 11, 1964, 5,751/64
3 Claims. (Cl. 252—47.5)

This invention relates to crankcase lubricating oil compositions comprising a blend of mineral lubricating oil, synthetic ester oil, and an amine additive, which composition is particularly useful for arduous service, such as occurs in racing cars.

In racing cars, the internal combustion engine operates under extremely ardous mechanical stresses and at high temperatures, with the result that the requirements upon the lubricating oils are quite severe. It has been found that a very successful crankcase lubricating oil for this purpose comprises mineral lubricating oil blended with diester oil and containing suitable additives.

Mineral lubricating oils which may be incorporated in the compositions of the invention include oils ranging from a viscosity of 2500 SSU/100° F. to SAE 30 grade oil, and include brightstocks, as well as lighter oils normally used in automotive engines.

The dialkyl diesters used in the compositions of the invention are those which correspond to the general formula:

$$ROOC(CH_2)_xCOOR$$

wherein R represents straight or branched-chain alkyl groups having about 6 to 16, e.g. 7 to 10, carbon atoms, and $x$ is about 2 to 10, e.g. 4 to 6. Preferred diesters are those wherein R is branched, as they have lower pour points. Examples of operable diesters include di-isohexyl suberate, di-2-ethylhexyl sebacate, di-n-octyl azelate, di-isodecyl adipate, etc. Where R is branched, the diester is preferably prepared by esterifying the desired alkandioic acid with an Oxo alcohol. These Oxo alcohols are isomeric mixtures of highly branched-chain primary alcohols obtained by the carbonylation of an olefin in the presence of a cobalt catalyst with carbon monoxide and hydrogen to form an aldehyde which is subsequently hydrogenated to form the alcohol. These alcohols and their preparation are well known in the art. $C_8$ Oxo alcohol prepared from a butylene-propylene feed, was used in preparing the diesters used in the working examples of the invention.

Complex esters can be mixed with the diester to increase the viscosity of the diester and improve its load-carrying ability. The more important of these complex esters used as lubricating oils can be represented by the general formula:

$$R_1—OOCR_2COO—(R_3—OOCR_4COO)_n—R_5$$

wherein $R_1$ and $R_5$ are alkyl radicals of monohydric alcohol, preferably a branched chain $C_6$ to $C_{10}$ alkanol, e.g. an Oxo alcohol, $R_2$ and $R_4$ are hydrocarbon radicals of a $C_4$ to $C_{12}$ dicarboxylic acid such as those used to make the aforesaid diester, and $R_3$ is the divalent hydrocarbon or hydrocarbonoxy radical of a $C_1$ to $C_{18}$ glycol or polyglycol, preferably a polyglycol of the formula $$HO(RO)_nH$$

where R is ethylene or propylene and $n$ is 2 to 30. "$n$" in the complex ester molecule will range from 1 to 6, usually 1 to 3, depending upon the product viscosity desired which is controlled by the relative molar ratio of the glycol or polyglycol to the dicarboxylic acid. In preparing the complex ester, there will usually be some simple ester formed, i.e. $n=0$, but this will generally be a minor portion, e.g. 10 to 40 wt. percent of the complex ester esterification reaction product. In general, the complex esters will have a total of 20 to 80, preferably 40 to 65, carbon atoms per molecule. Complex esters and methods for their preparation are known in the art and have been described in various patents. A complex ester material used in the working examples of the invention was prepared by simultaneously reacting one molar proportion of polyethylene glycol of about 200 molecular weight, with two molar portions of sebacic acid and two molar proportions of $C_9$ Oxo alcohol. This resulted in about 35 wt. percent of diester of the dicarboxylic acid and alcohol, and about 65 wt. percent of complex ester of the formula: Alcohol—Acid—(Glycol—Acid)$_x$—Alcohol were $x$ averaged about 1.8.

Polyoxyalkylene glycol lubricating oils have been found very useful for blending with the synthetic ester oils for improving their water tolerance and for also improving their viscosity properties, e.g. see U.S. Patent No. 2,944,973. Preferred are those of the general formula:

$$R—(OR')_xOR''$$

wherein R is a straight or branched-chain alkyl group of 1 to 20, e.g. 3 to 10 carbon atoms, R' is an aliphatic hydrocarbon radical, preferably saturated, either branched or straight chain of about 1 to 5, e.g. 2 to 3 carbon atoms, R'' is either hydrogen or R, and $x$ is a number of about 10 to 100, e.g. 40 to 90. Specific examples of such materials include: n-$C_{13}H_{27}$—$(OCH_2CH_2)_{20}OH$;

iso-$CH_{13}H_{27}$—$(OCH_2CH_2CH_2)_{80}OH$ n-$C_4H_9(OCH_2CH_2)_{100}OH$; n-$C_4H_9(OCH_2CH_2)_{40}OH$
   |                                |
   $CH_3$                           $CH_3$ $C_3H_7(OCH_2CH_2)_{30}OC_3H_7$ etc. Also included are materials wherein the polymer chain may consist of different alkylene oxide groups, e.g. ethylene oxide and propylene oxide in the same chain, and in the case of diethers, the terminal alkyl groups may be the same or different. Materials of the preceding types and their preparation are well known in the art and have been described in numerous patents, e.g. U.S. 1,976,678; 2,425,845; 2,520,611; 2,520,612; etc. Actually, however, the commercial preparation of these mono- and diether polyglycols represent mixtures of compounds of varying chain lengths. An example of such a commercially available material is sold under the trade name Ucon Lubricant LB-1715 and is a monoether polyglycol prepared from n-butyl alcohol and propylene oxide. This material has a viscosity of 264.0 SUS. at 210° F., 1715 SUS at 100° F., and 140,600 SUS at 0° F., and a molecular weight of about 2500. A similar type material, but of different viscosity and molecular weight is Ucon Lubricant LB-1145 having a viscosity of 1145 SUS at 100° F. Both of these Ucon oils have been further described in U.S. Patent 2,944,973.

Secondary diaryl amine antioxidants have been found to be very effective oxidation inhibitors for the lubricant compositions of the invention. These amines include those of the formula:

$$\underset{R-N-R'}{\overset{H}{|}}$$

wherein R is a phenyl group and R' is either a naphthyl or a phenyl group. Either, or both, R and R' can be substituted with one or two $C_1$ to $C_{10}$ alkyl groups. Examples of such amines include phenyl-alpha-naphthylamine, phenyl-beta-naphthylamine, diphenylamine, mono-n-octyl diphenylamine, di-$C_8$ Oxo diphenylamine, etc.

Two to six parts by weight of the secondary diaryl amines are preferably used in conjunction with one part of phenothiazine (which is the common antioxidant for ester oils). The resulting combination of these two antioxidants gives more effective oxidation protection, particularly at the high temperatures encountered during racing, than either alone.

Compositions of the invention are readily prepared by simply mixing the components together. These compositions will preferably comprise about 10 to 50 vol. percent of mineral lubricating oil mixed with 90 to 50 vol. percent of the synthetic oil blend containing the additives, the diester oil, and optionally complex ester oil and the polyoxyalkylene glycol oil. Usually the final lubricating composition will have a viscosity of 10 to 15 cs. at 210° F. The aforesaid synthetic oil blends have the following compositions:

| Synthetic oil blend: | Percent by weight based on total synthetic oil blend |
|---|---|
| Diester | 40–75 |
| Polyoxyalkylene glycol | [1] 0–30 |
| Complex ester | [1] 0–30 |
| Phenothiazine | 0.4–2 |
| Secondary aromatic amine | 3–6 |

[1] Preferably 10 to 30%.

The compositions of the invention may contain small proportions, e.g. 0.001 to 3.0 wt. percent each, based on the weight of the final lubricating compositions, of additive components to further enhance the load-carrying, cleanliness and other properties of the lubricating oil. Thus sulphur, chlorine and/or phosphorus compounds may be incorporated to improve the load-carrying ability of the compositions. Particularly useful load-carrying agents are the alkyl diesters of chlorendic acid. Other load-carrying agents include the partial esters of di, tri, or tetra-basic aromatic acids or anhydrides thereof, the incorporation of which has been found to impart an increase in engine cleanliness, which effect is in addition to the increase in load-carrying properties normally imparted by this class of compound. The partial ester of the polybasic aromatic acid may thus be a monoester of pyromellitic, prehnitic, or trimellitic acid, including the corresponding full or partial anhydrides thereof, with a $C_3$ to $C_{20}$ alcohol, preferably a secondary alcohol. Particularly useful compounds are esters of the polycarboxylic aromatic acids hereinbefore described, particularly pyromellitic dianhydride or trimellitic acid with methyl isobutyl carbinol.

Small proportions of corrosion-inhibiting additives may also be included in the compositions of the invention, including such components as free dicarboxylic acids, e.g. sebacic acid, mahogany sulphonates or benzotriazole.

Anti-foaming agents such as silicones may also be incorporated, etc.

The invention will be further explained by reference to the following examples, which include a preferred embodiment of the invention.

*Example I*

59 parts by weight of the diester of azelaic acid and a $C_8$ Oxo alcohol; 23 parts by weight of a complex ester material which was the reaction product of one molar proportion of polyethylene glycol of about 200 molecular weight, two molar proportions of sebacic acid and two molar proportions of nonyl ($C_9$ Oxo) alcohol, and contained about 65 wt. percent complex ester and about 35 wt. percent dinonyl sebacate, and 17 parts by weight of the polyoxyalkylene glycol UCON LB 1145, were mixed together. The resulting blend therefore consisted of a total of about 67 parts of diester, about 15 parts of complex ester and about 17 parts of the UCON LB 1145. Then, 1 wt. percent of phenothiazine and 4 wt. percent of di(isooctylphenyl) amine, wherein the isooctyl was a dimer of isobutylene, was added. Said weight percents being based on the weight of the total synthetic oil blend. 70 parts by volume of the resulting total synthetic oil blend was then mixed with 30 parts by volume of a mineral lubricating oil having a viscosity of 2500 SSU. at 100° F., to give a final lubricating oil composition having a viscosity in the range 10–15 cs. at 210° F.

The final lubricating oil composition of Example I was tested in a Petter W-1 Engine Test along with several commercial racing car crankcase lubricants. The results are summarized in the following table:

TABLE.—PETTER W-1 ENGINE TESTS

| | Composition | | | Maximum Possible Rating |
|---|---|---|---|---|
| | Example I | Competitive Oil 1 | Competitive Oil 2 | |
| Ring Sticking: | | | | |
| Ring 1 | Free | (¹) Free | (²) Free | Free |
| Ring 2 | Free | Free | Free | Free |
| Ring 3 | Free | Sluggish | Free | Free |
| Oil Ring Rating | 9.9 | 9.6 | 9.9 | 10.0 |
| Piston Skirt Lacquer Rating | 10.0 | 8.7 | 6.3 | 10.0 |
| Under Crown Rating | 9.8 | 3.8 | 4.8 | 10.0 |
| Total Bearing Weight Loss (mgs.) | 50 | 252 | 1,034 | |
| Viscosity Increase after 36 hours | 32.8 | 136.3 | 216 | |

[1] 5% Pinched.
[2] 50% Stuck.

As seen by the preceding table, the composition of the invention, represented by Example I, gave an exceptionally clean engine with very low deposit formation, a low bearing weight loss and a low viscosity increase and was superior to the two competitive racing car oils. Engine cleanliness is particularly important, especially during long distance races of several hundred miles or more, since ring sticking can result in lost compression and power. Also, oil deposits can cause spark plug fouling, fouling of the small passages of the hydraulic valve lifter systems, etc., any of which can lose a race. Low bearing weight loss and minimizing wear is also important in racing cars.

The composition of Example I was also used in a Lotus racing car powered by a Coventry Climax engine and successfully performed in racing competition giving no lubrication difficulties.

What is claimed is:

1. A lubricating oil having a viscosity in the range of 10 to 15 cs. at 210° F. and low deposit forming tendencies, and suitable for racing car use comprising a blend of:
    (A) 10 to 50 vol. percent of mineral lubricating oil and
    (B) 90 to 50 vol. percent oil blend, said synthetic oil blend comprising:
        (a) about 40 to 75 wt. percent diester of $C_6$ to $C_8$ saturated aliphatic dicarboxylic acid and a $C_7$ to $C_{10}$ branched chain alkanol,
        (b) about 10 to 30 wt. percent of polyoxyalkylene glycol oil of the formula: R—$(OR')_xOR''$ wherein R is a $C_1$ to $C_{20}$ alkyl group, R' is a $C_1$ to $C_5$ aliphatic saturated hydrocarbon radical, R'' is selected from the group consisting of hydrogen and R, and $x$ is 40 to 90, (c) about 10 to 30 wt. percent of complex ester oil of the formula:

$$R_1-OOCR_2COO-(R_3-OOCR_4COO)_n-R_5$$

wherein $R_1$ and $R_5$ are $C_6$ to $C_{10}$ alkyl radicals, $R_2$ and $R_4$ are saturated hydrocarbon radicals of $C_4$ to $C_{12}$ dicarboxylic acid, $R_3$ is the radical of a polyglycol of the formula: $HO(RO)_nH$ wherein R is a $C_2$ alkylene group and $n$ is 2 to 30, (d) about 0.4 to 2 wt. percent of phenothiazine as antioxidant and (e) about 3 to 6 wt. percent of secondary amine of the formula:

$$R-\underset{\underset{H}{|}}{N}-R'$$

wherein R and R' are phenyl groups, each substituted with one $C_1$ to $C_{10}$ alkyl group, wherein all of said weight percents are based on the total weight of said synthetic oil blend.

2. A lubricating oil suitable for racing car use comprising a blend of:

(A) 10 to 50 vol. percent of mineral lubricating oil and (B) 90 to 50 vol. percent oil blend, said synthetic oil blend comprising:

(a) about 40 to 75 wt. percent diester of azelaic acid and $C_8$ branched chain aliphatic alcohol, (b) about 10 to 30 wt. percent of polyoxyalkylene glycol oil of the formula: $R-(OR')_xOR''$ wherein R is a $C_1$ to $C_{20}$ alkyl group, R' is a $C_1$ to $C_5$ aliphatic saturated hydrocarbon radical, R'' is selected from the group consisting of hydrogen and R, and $x$ is 5 to 50, (c) about 10 to 30 wt. percent of complex ester oil prepared by simultaneously esterifying two molar proportions of sebacic acid, two molar proportions of branched chain $C_6$ to $C_{10}$ alkanol and one molar proportion of polyethylene glycol having 2 to 20 ethylene oxide linkages, (d) about 0.4 to 2 wt. percent of phenothiazine as antioxidant and (e) about 3 to 6 wt. percent of di(isooctylphenyl) amine, wherein all of said weight percents are based on the total weight of said synthetic oil blend.

3. A lubricating oil according to claim 2, wherein the amount of said mineral oil is 30 vol. percent, the amount of said synthetic oil blend is 70 vol. percent, said synthetic oil blend consists of a mixture of 59 parts by weight of di-$C_8$ Oxo azelate, 17 parts by weight of polyoxyalkylene glycol lubricating oil prepared from n-butyl alcohol and propylene oxide, and 23 parts by weight of a complex ester material produced by simultaneous reaction of one molar proportion of polyethylene glycol of about 200 mol. weight, two molar proportions of sebacic acid and two molar proportions of $C_9$ Oxo alcohol, the amount of said phenothiazine is about 1 wt. percent, and the amount of said di(isooctylphenyl) amine is about 4 wt. percent.

References Cited

UNITED STATES PATENTS

| | | | |
|---|---|---|---|
| 2,543,735 | 2/1951 | Stewart et al. | 252—52 |
| 2,944,973 | 7/1960 | Langer et al. | 252—56 |
| 3,126,344 | 3/1964 | Matuszak et al. | 252—56 |
| 3,247,115 | 4/1966 | Kluge et al. | 252—56 |

DANIEL E. WYMAN, *Primary Examiner.*

P. P. GARVIN, *Assistant Examiner.*